(12) United States Patent
Letz et al.

(10) Patent No.: US 9,760,420 B1
(45) Date of Patent: Sep. 12, 2017

(54) FLEET HOST REBUILD SERVICE IMPLEMENTING VETTING, DIAGNOSTICS, AND PROVISIONING POOLS

(71) Applicant: Amazon Technologies, Inc., Reno, NV (US)

(72) Inventors: Stefan Letz, Seattle, WA (US); Ross Bevan Engers, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 14/476,504

(22) Filed: Sep. 3, 2014

(51) Int. Cl.
   *G06F 11/07* (2006.01)
   *G06F 11/30* (2006.01)
   *G06F 11/20* (2006.01)

(52) U.S. Cl.
   CPC .......... *G06F 11/0709* (2013.01); *G06F 11/20* (2013.01); *G06F 11/2007* (2013.01); *G06F 11/2041* (2013.01); *G06F 11/3006* (2013.01); *G06F 11/3048* (2013.01); *G06F 11/3058* (2013.01); *G06F 11/3089* (2013.01); *G06F 2201/805* (2013.01)

(58) Field of Classification Search
   CPC .................................................. G06F 11/2007
   See application file for complete search history.

(56) References Cited

U.S. PATENT DOCUMENTS

| | | | | |
|---|---|---|---|---|
| 4,412,281 A | * | 10/1983 | Works .................... | G06F 11/10 714/4.5 |
| 4,847,837 A | * | 7/1989 | Morales .............. | G06F 11/2007 370/222 |
| 5,313,628 A | * | 5/1994 | Mendelsohn ........ | G06F 11/2025 714/3 |
| 6,145,096 A | * | 11/2000 | Bereiter .............. | G06F 11/0748 714/25 |
| 6,643,801 B1 | * | 11/2003 | Jammu ............... | G05B 19/4184 701/29.4 |
| 6,658,598 B1 | * | 12/2003 | Sullivan .............. | G06F 11/2294 714/25 |
| 9,286,179 B1 | * | 3/2016 | Shalla ..................... | G06F 11/26 |
| 2002/0178396 A1 | * | 11/2002 | Wong .................. | G06F 11/0709 714/4.11 |
| 2003/0105867 A1 | * | 6/2003 | Colrain ................. | G06F 9/5061 709/225 |

(Continued)

OTHER PUBLICATIONS

Pepper J, Kahn GS. Repair Strategies in a Diagnostic Expert System. InIJCAI Aug. 23, 1987 (pp. 531-534).*

*Primary Examiner* — Matt Kim
*Assistant Examiner* — Paul Contino
(74) *Attorney, Agent, or Firm* — Lee & Hayes, PLLC

(57) ABSTRACT

A fleet rebuild service examines hosts in a fleet to determine whether any of the hosts in the fleet are to be rebuilt. If a host is to be rebuilt, the fleet rebuild service moves the host to a vetting pool. The fleet rebuild service, or another service, may cause automated testing to be performed on the hardware and/or software of hosts in the vetting pool. If a host passes the automated testing, the fleet rebuild service may move the host from the vetting pool to a provisioning pool. If a host does not pass the automated testing, the host may be moved from the vetting pool to a diagnostics pool for further testing. The fleet rebuild service may select hosts from the provisioning pool for automated configuration and deployment to the fleet.

18 Claims, 9 Drawing Sheets

(56) References Cited

U.S. PATENT DOCUMENTS

| | | | |
|---|---|---|---|
| 2004/0153686 A1* | 8/2004 | Gilstrap | G06F 11/0727 714/1 |
| 2005/0050398 A1* | 3/2005 | Rao | G06F 11/0709 714/39 |
| 2006/0053337 A1* | 3/2006 | Pomaranski | G06F 11/0709 714/4.12 |
| 2006/0248392 A1* | 11/2006 | Barlow | G06F 11/073 714/30 |
| 2009/0037496 A1* | 2/2009 | Chong | G06F 11/0709 |
| 2012/0226943 A1* | 9/2012 | Alderman | G06F 11/0751 714/37 |

* cited by examiner

FLEET HOST REBUILD SERVICE IMPLEMENTING VETTING, DIAGNOSTICS, AND PROVISIONING POOLS

BACKGROUND

Distributed computing networks are commonly utilized to operate fleets of network hosts that are configured to provide different types of functionality. For example, a fleet of network hosts may be configured to execute a Web server application in order to receive and respond to requests for Web pages or other types of data. Other types of applications and/or services might also be executed on the network hosts in such a fleet.

Operation of a fleet of network hosts can be a complicated, expensive and time consuming process. In some installations, for example, the operator of a network service executing on a fleet of network hosts is responsible for any hardware failures occurring within the network hosts. As another example, a service owner might also be responsible for ensuring that the software stack utilized on a fleet of network hosts is up to date and that versions of software within the stack are consistent among the network hosts in the fleet. These, and potentially other requirements, might cause the operation and maintenance of a fleet of network hosts to be difficult for a service owner or other individual or organization tasked with operating or maintaining such a fleet.

The disclosure made herein is presented with respect to these and other considerations.

DETAILED DESCRIPTION

Figure 1:
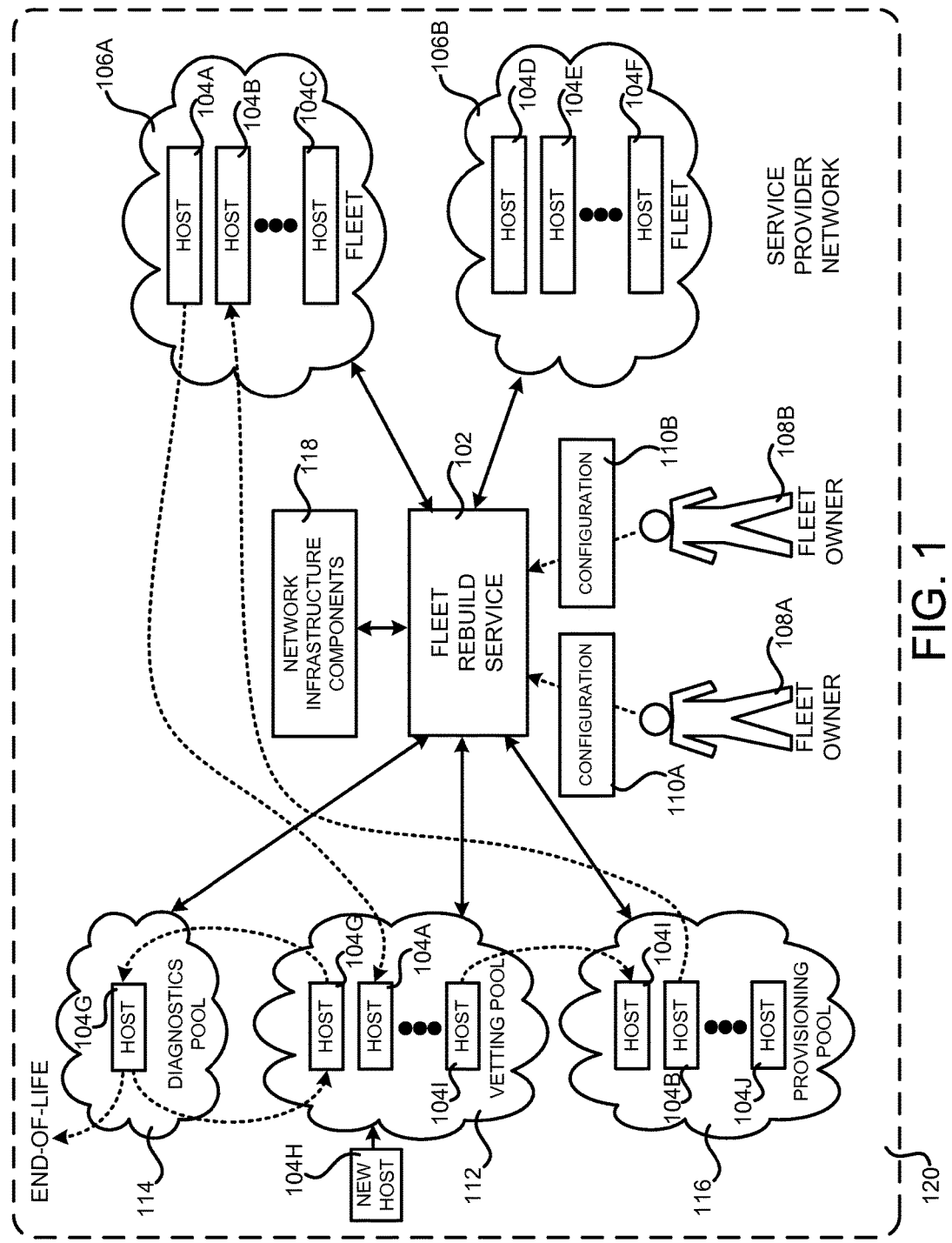
FIG. 1 is a system architecture diagram showing aspects of the configuration and operation of a fleet rebuild service in one configuration presented herein.

The following detailed description is directed to technologies for providing a fleet rebuild service. Utilizing the technologies described herein, a fleet rebuild service can be implemented that provides functionality for periodically examining the network hosts ("hosts") in a fleet to determine whether any of the hosts are to be rebuilt. If a host is to be rebuilt, the fleet rebuild service moves the host to a vetting pool. The fleet rebuild service, or another service, may cause automated testing to be performed on the hardware and/or software of hosts in the vetting pool. If a host passes the testing, the fleet rebuild service may move the host from the vetting pool to a provisioning pool. The fleet rebuild service may also select hosts from the provisioning pool for automated configuration and deployment to the fleet. Through the utilization of such a fleet rebuild service, a service owner can be freed from many tasks associated with maintaining the hardware and software that implements a service.

According to one configuration presented herein, a fleet rebuild service is provided that operates within or in conjunction with a service provider network. The fleet rebuild service is a network service that provides functionality for rebuilding hosts operating in the service provider network. The hosts may be physical hosts, such as server computers, or virtual hosts, such as virtual machine instances. As will be described in greater detail below, the fleet rebuild service provides functionality for periodically removing a host from a fleet in order to perform testing on the hardware and/or software of a host. The fleet rebuild service also provides functionality for configuring hosts for deployment to a fleet in a manner specified by an administrator, such as an owner or operator of a service that executes on the fleet. In this way, each host can be periodically tested and its software configuration updated in a manner that does not effect the operation of the other hosts in the fleet.

In order to configure the operation of the fleet rebuild service with respect to a particular fleet of hosts, an administrator, such as an owner or operator of a service that executes on the fleet, provides a configuration for use by the fleet rebuild service in rebuilding the hosts of the fleet. The configuration may include rebuild parameters that define the conditions under which a host in the fleet is to be rebuilt. For example, and without limitation, the rebuild parameters may define a time schedule for rebuilding hosts in the fleet, a maximum age of software or hardware of a host in the fleet, one or more health parameters for use in determining when a host is to be rebuilt, and/or one or more operational metrics for use in determining when a host is to be rebuilt. Details regarding the use of these and other rebuild parameters will be provided below.

The configuration might also specify one or more provisioning parameters for use in selecting a host for deployment to the fleet. The provisioning parameters may include, without limitation, fleet size preferences or requirements, hardware preferences or requirements, location preferences or requirements, and/or cost preferences or requirements. Details regarding the use of these and other provisioning parameters will be provided below.

An administrator, such as an owner or operator of a service that executes on the fleet, might also specify one or more hardware and/or software tests for use in automated testing of hosts that have been temporarily removed from the fleet. Additionally, the administrator might also provide provisioning software components for use in configuring a host for deployment to the fleet. The provisioning software components may include, for example, scripts, executable code, program installers, and other types of software components for installing software on a host and for configuring the host in a desired manner. Additional details regarding the hardware and/or software tests and the provisioning software components are presented below.

The fleet rebuild service utilizes the rebuild parameters to determine if any host currently in a fleet is to be rebuilt. For example, and without limitation, the fleet rebuild service might determine that the age of the hardware of a host exceeds the maximum age specified by the rebuild parameters. In another example, the fleet rebuild service might determine that a host is not operating within a specified range of acceptable values for one or more health-related parameters (e.g. disk drive errors). As yet another example, the fleet rebuild service might determine that a particular host is not operating at the same or similar level as other hosts in the fleet with regard to a particular operational metric, such as network throughput or requests processed per second. In these cases, a host may be selected for rebuilding.

If the fleet rebuild service identifies a host in the fleet that is to be rebuilt, the fleet rebuild service may instruct the host that is to be rebuilt to stop accepting incoming network requests or to stop the performance of other types of processing. The fleet rebuild service might also de-activate the host to be rebuilt. For example, the fleet rebuild service might notify one or more network infrastructure components, such as firewalls, routers, and/or domain name system ("DNS") servers, that the host to be rebuilt is no longer available to service network requests. Other types of actions might also be taken to de-activate a host to be rebuilt including, but not limited to, notifying a service that distributes work to hosts or executing a user-supplied deactivation script or other type of software component.

Once the host to be rebuilt has been deactivated, the fleet rebuild service moves the host from the fleet to a "vetting pool." As will be described in detail below, the vetting pool is utilized to store hosts during testing. New hosts added to the service provider network might also be added to the vetting pool for testing prior to deployment to a fleet in the service provider network.

In order to test the hosts in the vetting pool, the fleet rebuild service, or potentially another service, causes the supplied hardware and/or software tests to be performed on the hosts in the vetting pool in an automated fashion. For example, and without limitation, automated tests may be performed on the hardware of the hosts in the vetting pool. If a host fails one or more of the tests, the host may be moved to a "diagnostics pool" for additional testing, including manual testing, diagnostics and, potentially, repair. If a host in the diagnostics pool fails the additional testing, the host may be scheduled for retirement. If a host in the diagnostics pool passes the additional testing, it may be returned to the vetting pool.

Hosts in the vetting pool that pass the automated testing may be moved to a "provisioning pool." The provisioning pool contains hosts that have been tested and that are ready to be deployed to a fleet in the service provider network. In order to select a host for deployment to a particular fleet, the fleet rebuild service utilizes the user-supplied provisioning parameters to select the host. For example, the provisioning parameters might specify hardware preferences or requirements which indicate that, for a given fleet, only hosts having certain hardware attributes (e.g. CPU, memory, and/or disk) are to be utilized. As another example, the provisioning parameters might specify location preferences or requirements, which indicate that, for a given fleet, only hosts within a specific network or physical location (e.g. rack, room, data center, availability zone), or not within a specific location, may be utilized. Additional details regarding the use of the provisioning parameters to select a host from the provisioning pool will be provided below.

Once a host has been selected for deployment to a fleet, the fleet rebuild service, or another service, utilizes the user-provided provisioning software components to configure the software stack of the selected host. For example, and without limitation, scripts and/or other software components may be executed in order to install and configure an operating system, libraries, an application stack and/or other software components on the selected host.

Once the selected host has been configured for deployment, the fleet rebuild service may move the selected host from the provisioning pool to the fleet. The fleet rebuild service may then activate the host. For example, and without limitation, the fleet rebuild service might notify one or more network infrastructure components, such as firewalls, routers, and/or DNS servers, that the host is now a member of the fleet and that the host is available to service live network requests. In some configurations, the fleet rebuild service is configured to add a host from the provisioning pool to the fleet prior to moving another host from the fleet to the vetting pool. In this way, the fleet does not suffer a reduction in capacity due to the rebuilding of a host. Other types of actions might also be performed to activate a host such as, but not limited to, notifying a service that distributes work to hosts or executing a user-supplied activation script or other type of software component.

It should be appreciated that the functionality provided by the fleet rebuild service might also be triggered by other events and/or conditions. For example, and without limitation, the failure of a host in a service provider network might trigger the rebuilding of that host in the manner described below. Additional details regarding the various components and processes described above for implementing a fleet rebuild service will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a fleet rebuild service 102 in one configuration presented herein. As shown in FIG. 1, and described briefly above, the fleet rebuild service 102 might operate within or in conjunction with a service provider network 120, from which customers can purchase and utilize computing resources (which may be referred to herein as "resources"), such as virtual machine instances and/or other types of computing resources, from a service provider on a permanent or as-needed basis.

Each type or configuration of a computing resource may be available from the service provider network 120 in different sizes. For example, a service provider might offer virtual machine instances or other types of data processing resources that are available for purchase and use that have many different configurations of processor capabilities, main memory, disk storage, and operating system. A service provider might also offer other types of resources for purchase and use by customers. For example, a service provider might offer hardware devices, database resources, file or block data storage resources, and/or networking resources, such as load balancing resources, DNS resources, virtual private cloud ("VPC") resources, virtual local area network ("VLAN") resources, and/or other types of hardware and software computing resources on a permanent or as-needed basis.

The service provider operating the service provider network 120 might also charge a fee for operating the resources to a customer that creates and uses the resources. The fee charged for a particular resource might be based upon the type and/or configuration of the resource. The fee charged for a particular resource might also be based upon the amount of time the resource is utilized. For example, in the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider network 120.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs"), such as the Internet. In the environment shown in FIG. 1, a service provider might operate one or more data centers configured to provide the resources in the service provider network 120 to its customers.

The resources described briefly above might also be provisioned and de-provisioned as needed in an automated fashion. For example, the service provider network 120 might instantiate a new instance of a computing resource, such as a virtual machine instance, in response to an increase in demand for a service. Other types of computing resources might also be provisioned and de-provisioned in a similar manner. The service provider network might also provide functionality for automatically scaling and/or de-scaling resources based upon demand for the resources or other factors.

A customer or potential customer of the service provider network 120 might utilize a customer computing system (not shown in FIG. 1) to communicate with the service provider network 120 over an appropriate data communications network. In this way, a customer computing system may be utilized to configure various aspects of the operation of the computing resources provided by the service provider network 120. For example, and without limitation, a customer computing system may be utilized to purchase computing resources in the service provider network 120, to configure aspects of the operation of the computing resources, and to perform other types of functionality with regard to the operation of the computing resources provided by the service provider network 120.

The customer computing system may be any type of computing device capable of connecting to the service provider network 120 via a suitable data communications network such as, but not limited to, a laptop or desktop computer, a tablet computing device, a server computer, or a mobile telephone. Administrative users employed by the operator of the service provider network 120, such as the fleet owners 108A and 108B, may also connect with and utilize resources provided by the service provider network 120 in a similar fashion.

The service provider network 120 may also be configured to provide various network services for both internal (i.e. for use by the operator of the service provider network 120) and customer use. For example, and without limitation, the service provider network 120 may provide a virtual computer system service, a block-level data storage service, a cryptography service, an on-demand data storage service, a notification service, an authentication service, a policy management service, a task service and, potentially, other services. These and other services may be utilized together to implement various types of network-based applications. Additional details regarding one implementation of the service provider network 120 and the various types of network services that might be provided thereby for customer and internal use will be provided below with regard to FIGS. 5-7.

As discussed briefly above, a fleet rebuild service 102 is disclosed herein that operates within or in conjunction with the service provider network 120. The fleet rebuild service 102 is a network service that provides functionality for rebuilding hosts 104 operating in the service provider network 120. The hosts 104 may be physical hosts, such as server computers, or virtual hosts, such as virtual machine instances. The hosts 104 may be organized into fleets 106. For example, a fleet 106 of hosts may be utilized to provide a certain network service or other type of functionality. In the configuration shown in FIG. 1, for instance, a fleet 106A includes the hosts 104A-104C. The fleet 106B includes the hosts 104D-104F. The hosts 104 in each fleet 106 may include different software and/or hardware configurations.

As will be described in greater detail below, the fleet rebuild service 102 provides functionality for periodically removing a host 104 from a fleet 106 in order to perform testing on the hardware and/or software of the host 104. The fleet rebuild service 102 also provides functionality for configuring hosts 104 for deployment to a fleet 106 in a manner specified by an administrator, such as an owner or operator of a service that executes on the fleet 106. In this way, each host 104 can be periodically tested and its software configuration updated in a manner that does not effect the operation of the other hosts 104 in the fleet 106.

In order to configure the operation of the fleet rebuild service 102 with respect to a particular fleet 106 of hosts 104, an administrator, such as an owner or operator of a service that executes on the fleet 106, provides a configuration 110 for use by the fleet rebuild service 102 in rebuilding the hosts 104 of the fleet 106 and for deploying hosts 104 to the fleet. For instance, in the example shown in FIG. 1, the fleet owner 108A has provided a configuration 110A for use in conjunction with the fleet 106A to the fleet rebuild service 102. Similarly, the fleet owner 108B has provided a configuration 110B for use in conjunction with the fleet 106B to the fleet rebuild service 102. It should be appreciated that although two fleets 106 have been shown in FIG. 1, the fleet rebuild service 102 may operate in the manner described herein with many more fleets 106 and hosts 104 than illustrated.

The configuration 110 provided to the fleet rebuild service 102 may include rebuild parameters that define the conditions under which a host 104 in a fleet 106 is to be rebuilt. For example, and without limitation, the rebuild parameters may define a time schedule for rebuilding hosts 104 in a fleet 106, a maximum age of software or hardware of a host 104 in a fleet 106, one or more health parameters for use in determining when a host 104 is to be rebuilt, and/or one or more operational metrics for use in determining when a host 104 is to be rebuilt. Details regarding the definition and use of these and other rebuild parameters will be provided below with regard to FIGS. 2, 3A and 3B.

The configuration 110 might also specify one or more provisioning parameters for use in selecting a host 104 for deployment to a fleet 106. The provisioning parameters may include, without limitation, fleet size preferences or requirements, hardware preferences or requirements, location preferences or requirements, and/or cost preferences or requirements. Additional details regarding the configuration 110, including the rebuild parameters and the provisioning parameters are provided below with regard to FIG. 2.

The configuration 110 might also specify one or more hardware and/or software tests for use in automated testing of hosts 104 that have been temporarily removed from a fleet 106. Additionally, the configuration 110 might also include provisioning software components for use in configuring a host 104 for deployment to a fleet 106. The provisioning software components may include, for example, scripts, executable code, program installers, and other types of software components for installing software on a host 104 and for configuring the host 104 in a desired manner. Additional details regarding the hardware and/or software tests and the provisioning software components are also presented below with regard to FIG. 2.

The fleet rebuild service 102 utilizes the rebuild parameters to determine if hosts 104 currently in a fleet 106 are to be rebuilt. For example, and without limitation, the fleet rebuild service 102 might determine that the age of the hardware of a host 104 exceeds the maximum age specified by the rebuild parameters. In another example, the fleet rebuild service 102 might determine that a host 104 is not operating within a specified range of acceptable values for one or more health-related parameters (e.g. disk drive errors). As yet another example, the fleet rebuild service 102 might determine that a particular host 104 is not operating at the same or similar level as other hosts 104 in the same fleet 106 with regard to a particular operational metric, such as network throughput or requests processed by a host 104 per second. In these cases, the fleet rebuild service 102 may select a host 104 for rebuilding.

If the fleet rebuild service 102 identifies a host 104 in a fleet 106 that is to be rebuilt, the fleet rebuild service 102 may instruct the selected host 104 that is to be rebuilt to stop accepting incoming network requests or to stop the performance of other types of processing. In the example shown in FIG. 1, for instance, the fleet rebuild service 102 has selected the host 104A to be rebuilt. In this example, the fleet rebuild service 102 might instruct the selected host 104A to complete the processing of any existing requests and to stop accepting incoming requests. The host 104A might provide a notification back to the fleet rebuild service 102 when it has completed processing of any existing requests.

The fleet rebuild service 102 might also perform other operations in order to de-activate the host 104A. For example, and without limitation, the fleet rebuild service 102 might notify one or more network infrastructure components 118, such as firewalls, routers, and/or DNS servers, that a host 104 to be rebuilt is no longer available to service network requests. In the example shown in FIG. 1, for instance, the fleet rebuild service 102 might instruct the network infrastructure components 118 that the host 104A in the fleet 106A is no longer available to service incoming service requests. The fleet rebuild service 102 might also perform other types of actions in order to deactivate a host 104 including, but not limited to, notifying a service that distributes work to hosts or executing a user-supplied deactivation script or other type of software component.

Once a host 104 to be rebuilt has been de-activated, the fleet rebuild service 102 moves the selected host 104 from the fleet 106 to a vetting pool 112. For instance, in the example shown in FIG. 1, the host 104A has been moved from the fleet 106A to the vetting pool 112. As described briefly above and below in more detail, the vetting pool 112 is utilized to store hosts 104 during testing. New hosts 104, such as the host 104H, that are added to the service provider network 120 might also be added to the vetting pool 112 for testing prior to deployment to a fleet 106 in the service provider network 120.

In order to test the hosts in the vetting pool 112, the fleet rebuild service 102, or potentially another service executing in the service provider network 120, causes the hardware and/or software tests supplied in the configuration 110 to be performed on the hosts 104 in the vetting pool 112 in an automated fashion. For example, and without limitation, automated tests may be performed on the hardware of the hosts 104 in the vetting pool 112. If a host 104 fails one or more of the tests, the host 104 may be moved to a diagnostics pool 114 for additional testing, including manual testing, diagnostics and, potentially, repair. In the example shown in FIG. 1, for instance, the host 104G has failed automated testing and has therefore been moved from the vetting pool 112 to the diagnostics pool 114.

It should be appreciated that various levels of testing might be applied to hosts 104 in the vetting pool 112. For example, and without limitation, only basic testing might be performed on hosts 104 added to the vetting pool 112 for certain reasons, such as the age of the software installation on the hosts 104. More thorough testing might be performed on hosts 104 added to the vetting pool 112 for other reasons, such as those hosts 104 experiencing operational problems. More intensive diagnostics might also be performed on those hosts 104 that have previously been in the vetting pool 112 some number of times (e.g. ten times). In this way, certain hosts 104 that are not experiencing operational problems or otherwise likely to fail may be minimally tested and quickly returned to the provisioning pool 116 for deployment to a fleet 106. Hosts 104 for which an increased likelihood of failure is possible may be tested more thoroughly.

If a host 104 in the diagnostics pool 114 fails the additional testing, the host 104 may be scheduled for retirement. For instance, in the example shown in FIG. 1, the host 104G in the diagnostics pool 114 may be retired if that host 104G fails additional testing. Conversely, if a host 104 in the diagnostics pool 114 passes the additional testing, it may be returned to the vetting pool 112. For example, if the host 104G passes the additional testing, it may be returned to the vetting pool 112. Additional details regarding the automated testing of hosts in the vetting pool 112 are provided below with regard to FIG. 4.

Hosts in the vetting pool 112 that pass automated testing may be moved to a provisioning pool 116. The provisioning pool 116 includes hosts 104 that have been tested and that are ready to be deployed to a fleet 106 in the service provider network 120. In order to select a host 104 for deployment to a particular fleet 106, the fleet rebuild service 102 utilizes the provisioning parameters supplied in the appropriate configuration 110 to select the host 104. For example, the provisioning parameters might specify hardware preferences or requirements which indicate that, for a given fleet 106, only hosts 104 having certain hardware attributes (e.g. CPU, memory, and/or disk) are to be utilized. As another example, the provisioning parameters might specify location preferences or requirements, which indicate that, for a given fleet 106, only hosts 104 within a specific network or physical location (e.g. rack, room, data center, availability zone), or not within a specific location, may be utilized. Additional details regarding the use of the provisioning parameters to select a host 104 from the provisioning pool 116 will be provided below with regard to FIGS. 2, 3A and 3B.

It should be appreciated that although a single provisioning pool 116 has been shown in FIG. 1, multiple provisioning pools 116 might be utilized in other configurations. For example, another provisioning pool 116 might be utilized to give priority for obtaining hosts 104 of a certain configuration to a particular fleet 106. In this way, certain hosts 104 might be reserved for use in a particular fleet 106. Reservation of and priority for certain hosts 104 might also be implemented by associating a tag with hosts in the provisioning pool 116 that indicate that the hosts 104 are reserved for use within a particular fleet 106. In this regard, it should be appreciated that multiple vetting pools 112 and diagnostics pools 114 might also be utilized in other configurations.

In some configurations, hosts 104 that have been in the provisioning pool 116 for a certain period of time may be moved back to the vetting pool 112 for re-testing. For example, hosts 116 that have been in the provisioning pool 116 for more than one month may be moved back to the vetting pool 112 for re-testing in the manner described above. Hosts 104 might also be moved from the provisioning pool 116 to the vetting pool 112 for other reasons in other configurations.

Once a host 104 has been selected for deployment to a fleet 106, the fleet rebuild service 102, or another service, utilizes the provisioning software components provided in the configuration 110 to configure the software stack of the selected host 104. For example, and without limitation, scripts and/or other software components may be executed in order to install and configure an operating system, libraries, an application stack and/or other software components on the selected host 104. In the example shown in FIG. 1, for instance, the host 104B has been selected for deployment to the fleet 106A. In this example, the fleet rebuild service 102 utilizes the provisioning software components specified in the configuration 110A for the fleet 106A to configure the software stack of the host 104B.

Once the selected host 104 has been configured for deployment to a fleet 106, the fleet rebuild service 102 may move the selected host 104 from the provisioning pool 116 to the destination fleet 106. In the example shown in FIG. 1, for instance, the fleet rebuild service 102 has moved the host 104B to the fleet 106A. The fleet rebuild service 102 may then activate the host 104B. For example, and without limitation, the fleet rebuild service 102 may notify one or more network infrastructure components 118, such as firewalls, routers, and/or DNS servers, that the host 104B is now a member of the fleet 106A and that the host 104B is available to service live network requests. The fleet rebuild service 102 might also perform other types of operations in order to activate a host 104 such as, but not limited to, notifying a service that distributes work to hosts or executing a user-supplied activation script or other type of software component.

As discussed briefly above, in some configurations, the fleet rebuild service 102 adds a host 104 from the provisioning pool 116 to a fleet 106 prior to moving another host 104 from the fleet 106 to the vetting pool 112. For instance, in the example shown in FIG. 1, the fleet rebuild service 102 might add the host 104B to the fleet 106A prior to removing the host 104A from the fleet 106A for rebuilding. In this way, the fleet 106A does not suffer a reduction in capacity due to the rebuilding of the host 104A. Additional details regarding the operation of the fleet rebuild service 102 will be provided below with regard to FIGS. 3A and 3B.

It should be appreciated that the fleet rebuild service 102 does not physically move the hosts 104. Rather, the fleet rebuild service 102 maintains data describing the hosts 104 that are in each fleet 106. The fleet rebuild service 102 also maintains data indicating the hosts 104 that are in the vetting pool 112, the diagnostics pool 114, and the provisioning pool 116. In order to "move" a host 104 between a fleet and the various pools, or between pools, the fleet rebuild service 102 may move the data identifying a host between different tables in a data store, for instance. Other data structures, databases, data stores, and other mechanisms might also be utilized to maintain data identifying the fleet 106 or pool that a particular host 104 is in at any given point in time.

Figure 2:
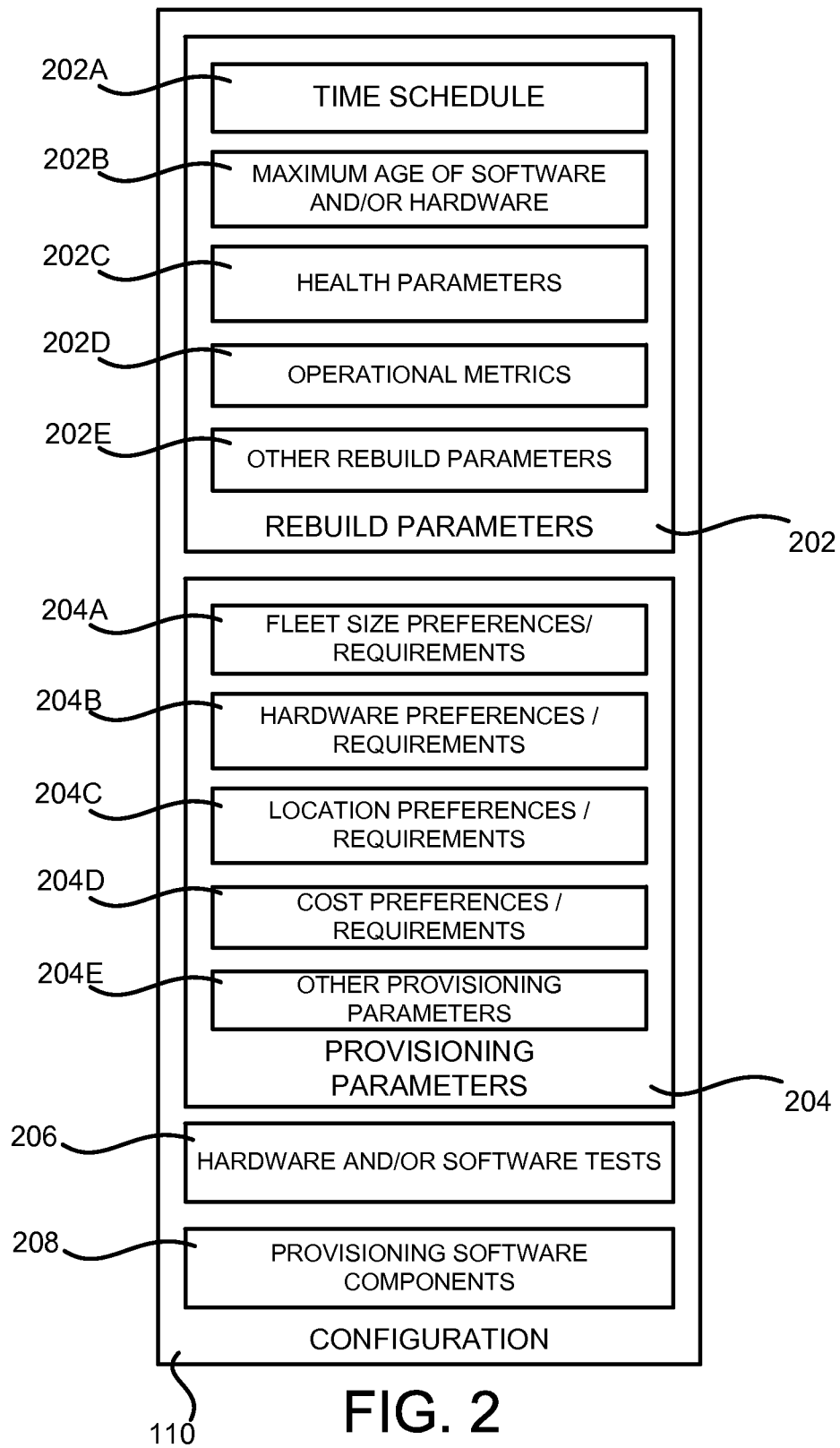
FIG. 2 is a data structure diagram illustrating aspects of configuration data consumed by a fleet rebuild service in one configuration described herein.

FIG. 2 is a data structure diagram illustrating aspects of a configuration 110 consumed by the fleet rebuild service 102 in one configuration described herein. As shown in FIG. 2 and described briefly above, the configuration 110 may include rebuild parameters 202, provisioning parameters 204, hardware and/or software tests 206, and/or provisioning software components 208. Each of these aspects of the configuration 110 will be described in greater detail below. It should be appreciated that the described configuration 110 is merely illustrative and that the configuration 110 might include more or fewer items than disclosed herein and that different items might also be utilized in other configurations.

The rebuild parameters 202 define one or more conditions under which a host 104 in a fleet 106 is to be rebuilt. For example, and without limitation, the rebuild parameters 202 may define a time schedule 202A for rebuilding hosts 104 in a fleet 106. For example, and without limitation, the time schedule 202A may indicate that a host 104 in a fleet 106 is to be rebuilt every six months or other time period. The time schedule 202A might also specify the number of hosts 104 that are to be rebuilt according to the specified time schedule. Other types of recurring time schedules for rebuilding a host 104 in a fleet 106 might also be specified.

The rebuild parameters 202 might also define a maximum age of software or hardware 202B of a host 104 in the fleet 106. For example, and without limitation, the rebuild parameters might specify that a host 104 in a fleet 106 can be no more than two years old and/or that the software on a host is to be rebuilt every one year. The minimum and/or maximum age of the hardware and/or software of the hosts 104 in a fleet 106 might also be defined in other ways in other configurations.

The rebuild parameters 202 may also, or alternately, define one or more health parameters 202C for use in determining when a host 104 is to be rebuilt. For example, and without limitation, the health parameters 202C might indicate that a host 104 is to be rebuilt if it exhibits certain types of operational health issues, such as disk drive errors, memory errors, dropped network packets, or other types of health issues. Any type of information indicative of the possibility of a future hardware failure of a host 104 may be utilized in this way. In some configurations, the hosts 104 are configured to execute a client application (not shown) that provides health information to the fleet rebuild service 102 for use in evaluating the rebuild parameters 202. In other configurations, the fleet rebuild service 102 obtains this information from another system or service in the service provider network 120.

The rebuild parameters 202 may also, or alternately, define one or more operational metrics 202D for use in determining when a host 104 is to be rebuilt. For example, and without limitation, the operational metrics 202D might specify that a host 104 that is not operating within a specified range of acceptable values for one or more operational metrics (e.g. network throughput, requests processed per second, memory utilization, cache misses, etc.) is to be rebuilt.

The operational metrics 202D might also be specified with reference to other hosts 104 in the same fleet 106. For example, the operational metrics 202D might specify that a host 104 is to be rebuilt if the host 104 is not operating within a certain statistical range of other hosts 104 in the same fleet 106 with regard to a particular operational metric, such as network throughput or requests processed by a host 104 per second. The operational metrics 202D might also be specified in other ways in other configurations. In this regard, it should be appreciated that the rebuild parameters 202 described above are illustrative and that other rebuild parameters 202E might also be utilized in other configurations.

In some configurations, the rebuild parameters 202E also define one or more restrictions ("restrictive parameters") on the manner in which hosts 104 may be rebuilt. For example, and without limitation, the restrictive parameters might specify the maximum number of hosts 104 in a fleet 106 that may be rebuilt at one time. Similarly, the restrictive parameters might also specify the maximum number of hosts 104 in a fleet 106 that may be rebuilt within a certain period of time (e.g. one week, month, year, etc.). Other types of restrictions on the manner in which hosts 104 are selected for being rebuilt might also be defined in other configurations.

The configuration 110 might also specify one or more provisioning parameters 204 for use in selecting a host 104 from the hosts 104 in the provisioning pool 116 for deployment to a fleet 106. The provisioning parameters 204 may include, for example, fleet size preferences or requirements 204A that define preferences or requirements regarding the minimum or maximum size of a fleet 106. For example, and without limitation, the fleet size preferences or requirements 204A might specify that a fleet 106 include a minimum number of hosts 104. In this case, if the number of hosts 104 in the fleet falls below the specified number, the fleet rebuild service 102 might select a host 104 from the provisioning pool 116 to deploy to the fleet 106. The fleet size preferences or requirements 204A might also specify the number of hosts 104 that are to be active at a given time in a fleet 106, in a particular data center, in a particular availability zone, and/or in another location. The selected host 104 might also need to satisfy some or all of the other provisioning parameters 204 described below.

The provisioning parameters 204 may also, or alternately, include hardware preferences or requirements 204B that specify preferences or requirements for the hardware utilized to implement hosts 104 in a particular fleet 106. For example, and without limitation, the hardware preferences or requirements 204B might specify particular hardware requirements, such as a particular CPU, amount of RAM, or amount of disk space. Alternately, the hardware preferences or requirements 204B might specify a minimum level of hardware required or preferred (e.g. a minimum of a 3 Ghz processor or a minimum of 2 GB of RAM). The hardware preferences or requirements 204B might be specified in terms of actual physical hardware or virtual hardware exposed by a virtual machine instance. Other types of hardware preferences or requirements 204B might also be specified for hosts 104 in a particular fleet 106.

The provisioning parameters 204 may also, or alternately, include location preferences or requirements 204C that specify preferences or requirements for the physical or logical location of hosts 104 within a fleet 106. For example, and without limitation, the location preferences or requirements 204C may indicate that, for a given fleet 106, only hosts 104 within a specific network or physical location (e.g. rack, room, data center, availability zone), or not within a specific location, may be utilized. The location preferences or requirements 204C might also be specified as a percentage of hosts 104 in a fleet 106 that are to be deployed to particular locations (e.g. data center or availability zone). For example, the location preferences or requirements 204C might specify that 50% of the hosts 104 in a fleet 106 are to be deployed to one data center and the other 50% of the hosts 104 in the fleet 106 are to be deployed to another data center in another geographic area. Other types of location preferences or requirements 204C might also be specified.

It should be appreciated that the location preferences and requirements 204C described above might be specific or non-specific. For example, specific location preferences and requirements 204 might specify the actual rack, room or data center for a host 104. Similarly, non-specific location preferences and requirements 204 might be defined that do not specify the specific location of a host 104, but that specify rules that may be utilized when selecting the location of the host 104. For example, a rule might indicate that a host 104 can be located in any server rack in a data center, but that the host 104 should not be located in a server rack that includes another host 104 in the same fleet 106. Other types of specific and non-specific location preferences and requirements 204C might also be specified.

The provisioning parameters 204 may also, or alternately, include cost preferences or requirements 204D. The cost preferences or requirements 204D may specify preferences or requirements regarding the cost of hosts 104 that can be utilized in a given fleet 106. For example, and without limitation, the cost preferences or requirements 204D might specify the maximum amount of money that might be spent on hosts 104 in a fleet 106 during a specified time period, such as per hour, per day, per month, or per year. The cost preferences or requirements 204D might also specify other restrictions or preferences regarding the costs associated with operating hosts 104 in a fleet 106 in the service provider network 120. It should be appreciated that the provisioning parameters 204 described above are illustrative, and that other provisioning parameters 204E might also be utilized in other configurations.

As shown in FIG. 2, the configuration 110 might also specify one or more hardware and/or software tests 206 for use in automated testing of hosts 104 that have been temporarily removed from a fleet 106. For example, and without limitation, the hardware and/or software tests 206 may be utilized to perform testing on hosts within the vetting pool 112. The hardware and/or software tests 206 might also be utilized to test hosts 104 in the provisioning pool 116 that have been configured but that have not yet been deployed to a fleet 106. The hardware and/or software tests 206 might also be utilized to test hosts 104 at other times during the lifecycle of a host 104.

As also shown in FIG. 2, the configuration 110 might also include the provisioning software components 208. As discussed briefly above, the provisioning software components 208 are for use in configuring a host 104 in the provisioning pool 116 prior to deployment of the host 104 to a fleet 106. The provisioning software components 208 may include, for example, scripts, executable code, program installers, and other types of software components for installing software on a host 104 and for configuring the host 104 in a desired manner. For example, and without limitation, scripts and/or other software components may be executed in order to install and configure an operating system, libraries, an application stack and/or other software components on a host 104 in the provisioning pool 116 that has been selected for deployment to a fleet 106.

It should be appreciated that the configuration 110 shown in FIG. 2 is merely illustrative and that other types of data might be specified in other configurations for use in selecting a host 104 to be rebuilt, for use in testing hosts 104, and for use in installing and configuring the software and hardware of a host 104 prior to deployment to a fleet 106 in the service provider network 120. Additionally, the various parameters described above may be assigned weights in some configurations that are consumed by the fleet rebuild service 102 when selecting a host 104 to be rebuilt and/or when selecting a host from the provisioning pool 116 for deployment to a fleet 106.

Figure 3A:
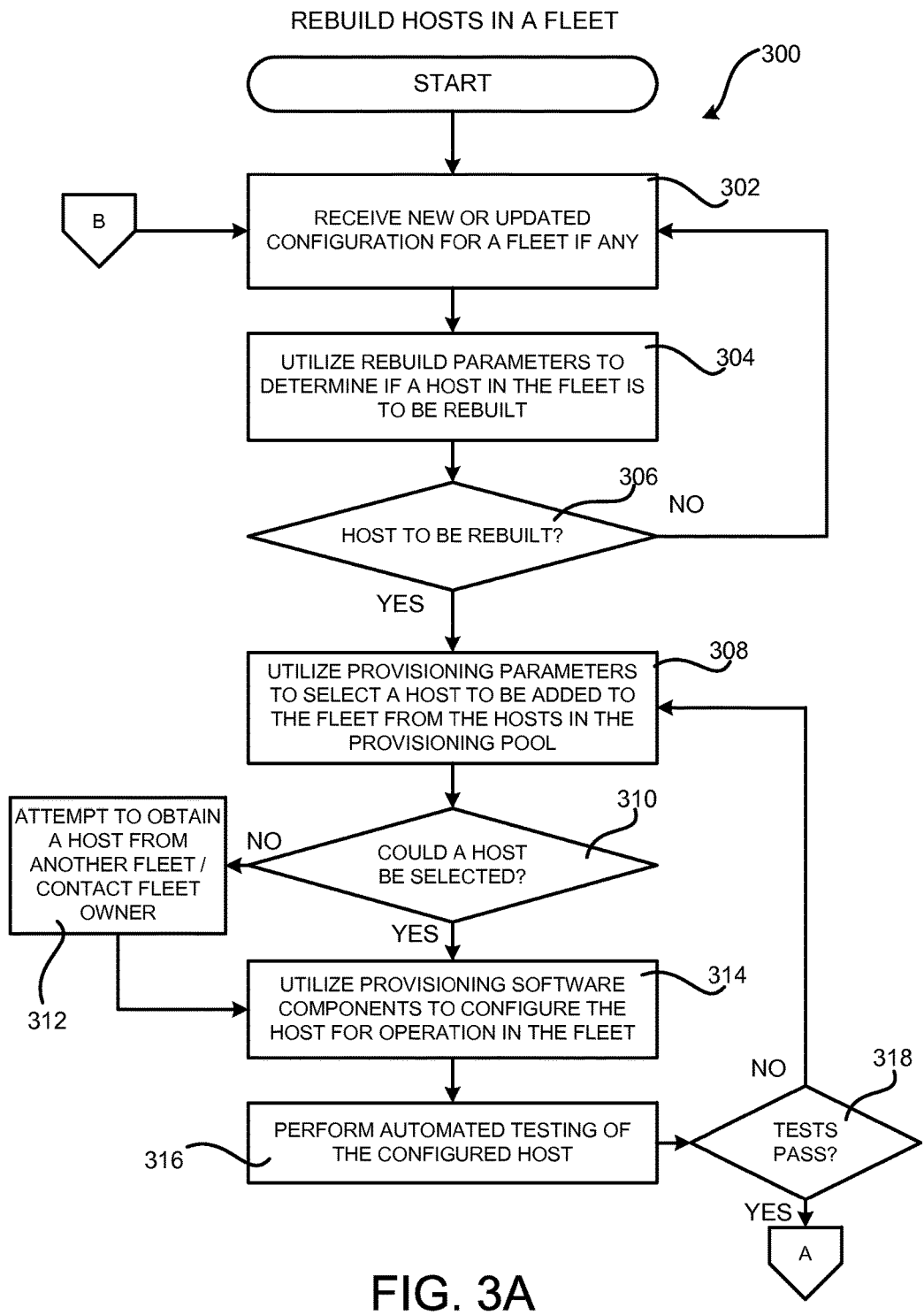
FIGS. 3A-3B are flow diagrams illustrating aspects of the operation of a fleet rebuild service in one configuration disclosed herein.
Figure 3B:
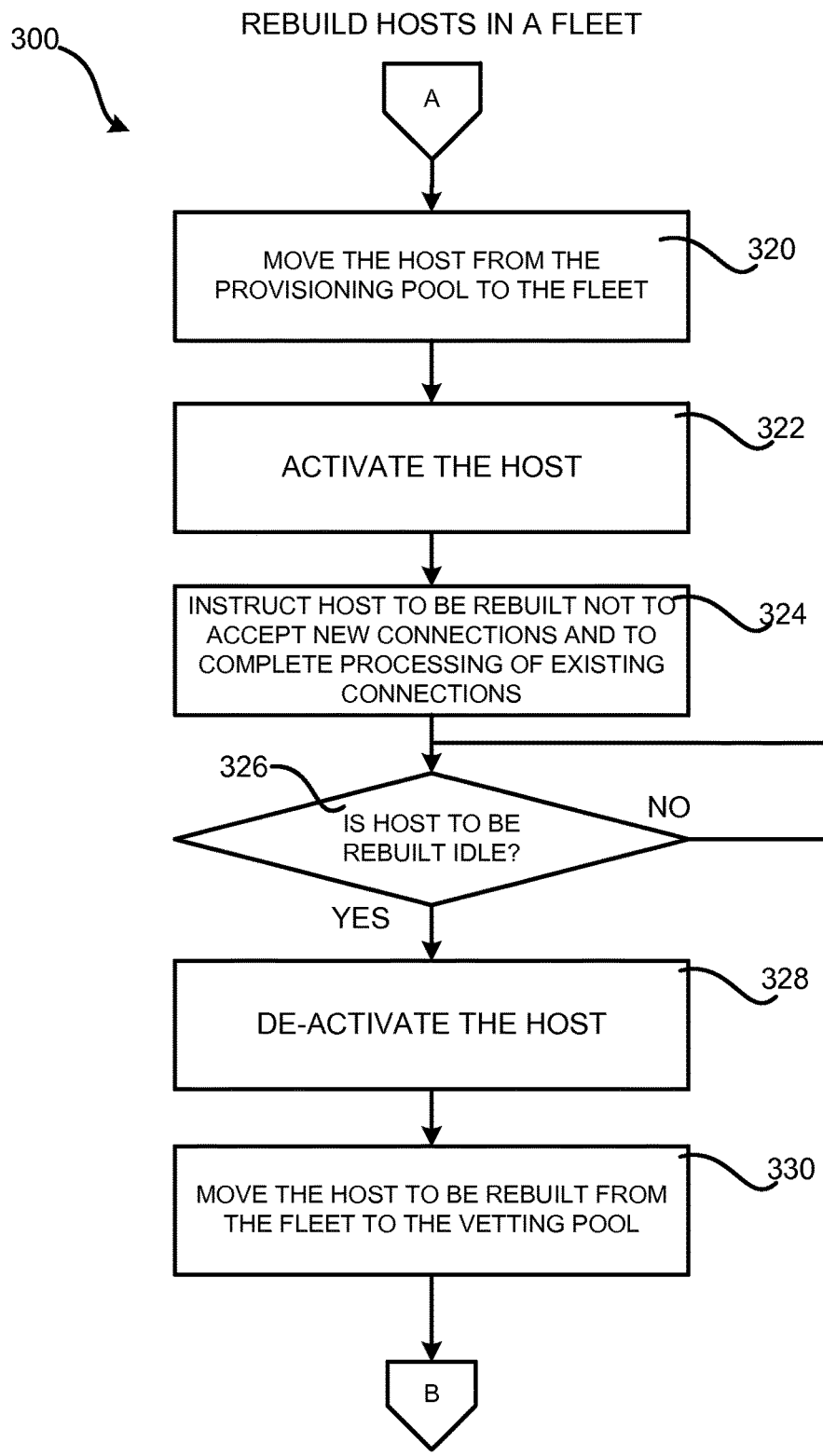

FIGS. 3A-3B are flow diagrams showing a routine 300 that illustrates aspects of the operation of a fleet rebuild service 102 in one configuration disclosed herein. It should be appreciated that the logical operations described herein with respect to FIGS. 3A and 3B, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the fleet rebuild service 102 receives a new or an updated configuration 110 for a fleet 106, if any. As discussed above, an authorized user associated with a fleet 106, such as a fleet owner 108, might submit the configuration 110 to the fleet rebuild service 102. In this regard, the fleet rebuild service 102 might provide an appropriate user interface ("UI") or network application programming interface ("API") through which the configuration 110 may be submitted.

When a configuration 110 is submitted, the fleet rebuild service 102 might perform a verification process on the configuration 110. For example, and without limitation, the fleet rebuild service 102 might verify that hosts 104 are available in the provisioning pool 116 that satisfy the provisioning parameters 204 specified in the configuration 110. If no hosts 104 exist in the provisioning pool 116 that satisfy the provisioning parameters 204, the fleet rebuild service 102 might reject the configuration 110. The fleet rebuild service 102 might also provide suggestions to the user submitting the configuration 110 as to how the configuration 110 may be modified in order to satisfy the verification process.

The fleet rebuild service 102 might also provide other types of UIs and/or network APIs in other configurations. For example, and without limitation, the fleet rebuild service 102, or potentially another service, might provide UIs and/or APIs through which a user can obtain data identifying the hosts 106 that are in their fleet 106, in the vetting pool 112, the diagnostics pool 114, and the provisioning pool 116. The fleet rebuild service 102 might also provide a UI or API through which a user can manually schedule a host 104 for rebuild and/or manually select a host 104 from the provisioning pool 116 for deployment to a fleet 106. The fleet rebuild service 102 might also provide other UIs and/or APIs in other configurations.

From operation 302, the routine 300 proceeds to operation 304, where the fleet rebuild service 102 utilizes the fleet rebuild parameters 202 corresponding to each fleet 106 to determine if any hosts 104 in the fleet are to be rebuilt. If no hosts 104 are to be rebuilt, the routine 300 proceeds from operation 306 back to operation 302, where the fleet rebuild service 102 may continue to receive new or updated configurations 110 for each fleet 106 and to utilize the rebuild parameters 202 in the updated configurations 110 to determine if any hosts 104 are to be rebuilt.

If, at operation 306, the fleet rebuild service 102 determines that a host 104 is to be rebuilt, the routine 300 proceeds from operation 306 to operation 308. At operation 308, the fleet rebuild service 102 utilizes the provisioning parameters 204 in the configuration 110 for the fleet 106 in order to select a host 104 from the provisioning pool 116 for deployment to the fleet 106.

In some cases, the fleet rebuild service 102 may be unable to select a host 104 from the hosts 104 in the provisioning pool 116 that matches the provisioning parameters 204. In this case, the routine 300 may proceed from operation 310 to operation 312, where the fleet rebuild service 102 may attempt to obtain a host 104 that satisfies the provisioning parameters 204 from another fleet 106 in the service provider network 120. For example, a host 104 may exist in the provisioning pool 116 that matches the provisioning parameters 204 for a fleet 106B and a host 104 in the fleet 106B that matches the provisioning parameters 204 for the fleet 106A. In this case, the host 104 in the provisioning pool 116 may be configured and deployed to the fleet 106B, and the host 104 in the fleet 106B may be returned to the provisioning pool 116 for configuration and deployment to the fleet 106A.

Other mechanisms might also be utilized to locate an available host 104 that satisfies the provisioning parameters 204 for a particular fleet 106. For example, and without limitation, the fleet rebuild service 102 may be configured to select a host 104 in the provisioning pool 116 that "best fits" the provisioning parameters 204 specified in the configuration 110. Other mechanisms might also be utilized.

If the fleet rebuild service 102 is unable to locate a host 104 satisfying the provisioning parameters 204, the fleet rebuild service 102 might also, or alternately, notify the fleet owner 108 or other authorized individual. For example, and without limitation, an email, short message system ("SMS") message, or other type of notification may be provided indicating that a host 104 could not be located. Additionally, the notification may ask the user to authorize locating an alternate host 104 in the manner described above, for modification of the provisioning parameters 204, for authorization to utilize a more expensive host 104, for authorization to utilize a "best fit" host 104, or for authorization to proceed in another manner.

If, at operation 310, the fleet rebuild service 102 is able to select a host 104 from the hosts 104 in the provisioning pool 116 that satisfies the provisioning parameters 204, the routine 300 proceeds to operation 314. At operation 314, the fleet rebuild service 102 utilizes the provisioning software components 208 specified in the configuration 110 to install software on the selected host 104 and to configure the operation of the selected host 104 for operation in the fleet 106. For example, and without limitation, the fleet rebuild service 102, or another service or component, might execute scripts, automated build instructions, and/or other software components in order to install and configure an operating system, libraries, packages, an application stack and/or other software components on the host 104 in the provisioning pool 116 that has been selected for deployment to a fleet 106.

Once the selected host 104 has been rebuilt in the manner described above, the routine 300 proceeds from operation 316, where the fleet rebuild service 102 and/or another service or component may perform automated testing on the configured host 104. As discussed above, hardware and/or software tests 206 defined by the fleet owner 108 or another authorized user might be utilized to test the operation of the host 104 prior to deployment to the fleet 106. If the host 104 fails the automated testing, the routine 300 proceeds back to operation 308, where a different host 104 might be selected and tested in the manner described above. If the additional testing fails, the host 104 might be moved back to the vetting pool 112 or the diagnostics pool 114 for additional testing.

If, at operation 318, it is determined that the configured host 104 has passed the hardware and/or software tests 206, the routine 300 proceeds from operation 318 to operation 320, where the fleet rebuild service 102 moves the configured host 104 to the destination fleet 106. The routine 300 then proceeds from operation 320 to operation 322, where the fleet rebuild service 102 updates the network infrastructure components 118 in order to indicate that the host 104 has been added to the fleet 106 and is available to serve live network traffic. For example, and without limitation, the fleet rebuild service 102 might configure routers, firewalls, DNS servers, VPCs and/or other network infrastructure components 118 to indicate the presence of a new host 104 in a fleet 106.

Once the new host 104 has been moved to the fleet 106, the routine 300 proceeds from operation 322 to operation 324, where the fleet rebuild service 102 instructs the host 104 to be rebuilt to complete the processing of any existing request and to stop accepting new requests. In some configurations, for example, the host 104 might expose a web service API through which the fleet rebuild service 102 can provide such an instruction. The host 104 to be rebuilt may call back to the fleet rebuild service 102 once it has completed the processing of any outstanding requests and is idle. Other mechanisms might also be utilized to instruct the host 104 to be rebuilt to complete its processing of outstanding requests.

Once the host 104 to be rebuilt is idle, the routine 300 proceeds from operation 326 to operation 328, where the fleet rebuild service 102 updates the network infrastructure components 118 to indicate that the host 104 to be rebuilt is no longer a member of the fleet 106. For example, and without limitation, the fleet rebuild service 102 might configure routers, firewalls, DNS servers, VPCs and/or other network infrastructure components 118 to indicate that the host 104 to be rebuilt is no longer available to service incoming requests.

From operation 328, the routine 300 proceeds to operation 330, where the fleet rebuild service 102 moves the host 104 to be rebuilt from the fleet 106 to the vetting pool 112. As will be described in greater detail below with regard to FIG. 4, automated tests provided by the fleet owner 108 or another authorized individual may be performed on the hosts 104 in the vetting pool 112. If the hosts 104 in the vetting pool 112 do not pass the testing, they may be moved to the diagnostics pool 114. If the hosts 104 in the vetting pool 112 pass the automated testing, they may be moved to the provisioning pool 116. Additional details regarding this process are provided below with regard to FIG. 4. From operation 330, the routine 300 proceeds back to operation 302, where the process described above with reference to FIG. 3 may be repeated.

Figure 4:
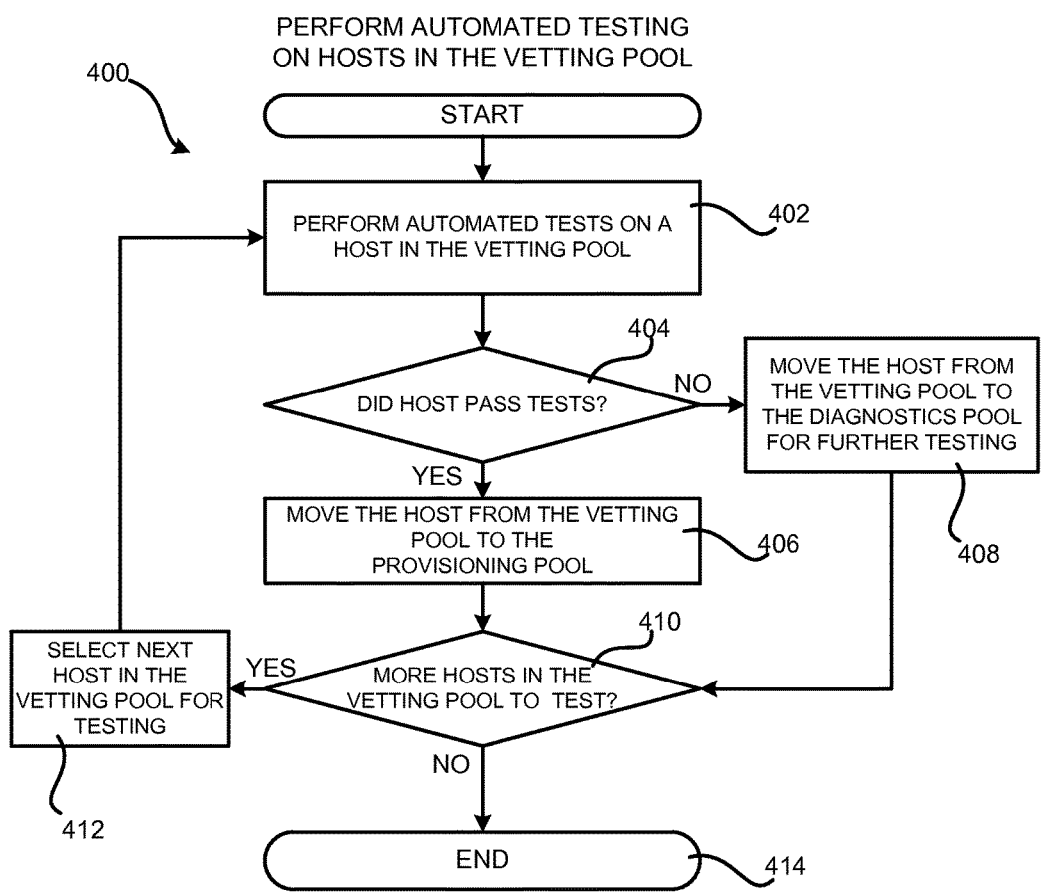
FIG. 4 is a flow diagram illustrating aspects of the operation of a mechanism disclosed herein for performing automated testing on hosts in a vetting pool in one particular configuration.

FIG. 4 is a flow diagram showing a routine 400 that illustrates aspects of the operation of a mechanism disclosed herein for performing automated testing on the hosts 104 in a vetting pool 112 in one particular configuration. The routine 400 begins at operation 402, where the fleet rebuild service 102, or another service or component, performs automated testing on a host 104 in the vetting pool 112. As discussed above, an authorized user, such as a service owner 108, may specify hardware and/or software tests 206 to be performed on the hosts 104 in the vetting pool 112.

From operation 402, the routine 400 proceeds to operation 404, where the fleet rebuild service 102 determines whether the host 104 passed the hardware and/or software tests 206. If the host 104 did not pass the hardware and/or software tests 206, then the routine 400 proceeds from operation 404 to operation 408. At operation 408, the fleet rebuild service 102 moves the host 104 that failed the hardware and/or software tests 206 from the vetting pool 112 to the diagnostics pool 114. The routine 400 then proceeds from operation 408 to operation 410.

If, at operation 404, the fleet rebuild service 102 determines that the host 104 did pass the hardware and/or software tests 206, then the routine 400 proceeds from operation 404 to operation 406. At operation 406, the fleet rebuild service 102 moves the host 104 being tested from the vetting pool 112 to the provisioning pool 116. As discussed above, hosts 104 in the provisioning pool 116 may be configured, tested, and moved to a fleet 106.

From operations 406 and 408, the routine 400 proceeds to operation 410, where the fleet rebuild service 102, or another service, determines whether there are additional hosts 104 in the vetting pool 112 to be tested. If additional hosts 104 remain in the vetting pool 112 to be tested, the routine 400 proceeds from operation 410 to operation 412 where a next host 104 to be tested is selected. From operation 412, the routine 400 then proceeds back to operation 402, where additional testing may be performed in the manner described above. If no additional hosts 104 remain in the vetting pool 112 to be tested, the routine 400 proceeds from operation 410 to operation 414, where it ends. The routine 400 might also be repeated in response to the addition of hosts 104 to the vetting pool 112 or in response to other stimuli, such as the specification of new hardware and/or software tests 206.

Figure 5:
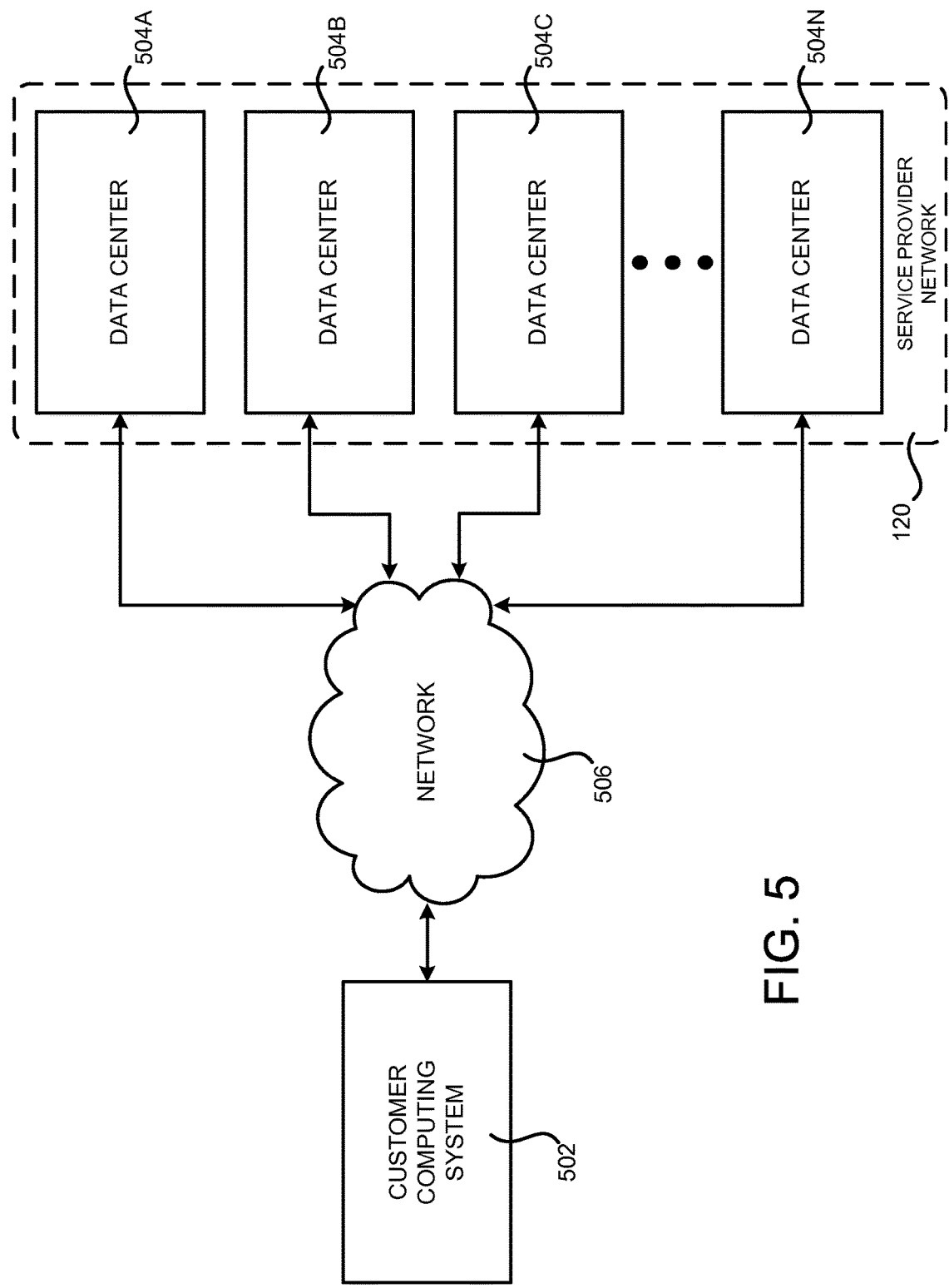
FIG. 5 is a system and network diagram that shows an illustrative operating environment for the various technologies disclosed herein that includes a service provider network that may be configured to implement aspects of the functionality described herein.

FIG. 5 is a system and network diagram that shows one illustrative operating environment for the configurations disclosed herein that includes a service provider network 120 that may be configured to provide a fleet rebuild service 102 in the manner described above, according to one configuration disclosed herein. As discussed briefly above, the service provider network 120 can provide computing resources, such as the hosts 104, on a permanent or an as-needed basis.

The computing resources provided by the service provider network 120 may include various types of computing resources, such as data processing resources, data storage resources, networking resources, data communication resources, and the like. Each type of computing resource may be general-purpose or may be available in a number of specific configurations. For example, and as described briefly above, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 120 might also be configured to provide various network services.

The computing resources provided by the service provider network 120 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for integrating a fleet rebuild service 102 within the service provider network 120 will be described below with regard to FIG. 7.

The customers and other users of the service provider network 120 may access the computing resources provided by the service provider network 120 over a network 506, such as a wide area network ("WAN"). For example, and without limitation, a customer computing system 502 might be utilized to access the service provider network 120 by way of the network 506. It should be appreciated that a local-area network ("LAN"), the Internet, or any other networking topology known in the art that connects the data centers 504 to remote customers and other users may be utilized. It should also be appreciated that combinations of such networks might also be utilized.

Figure 6:
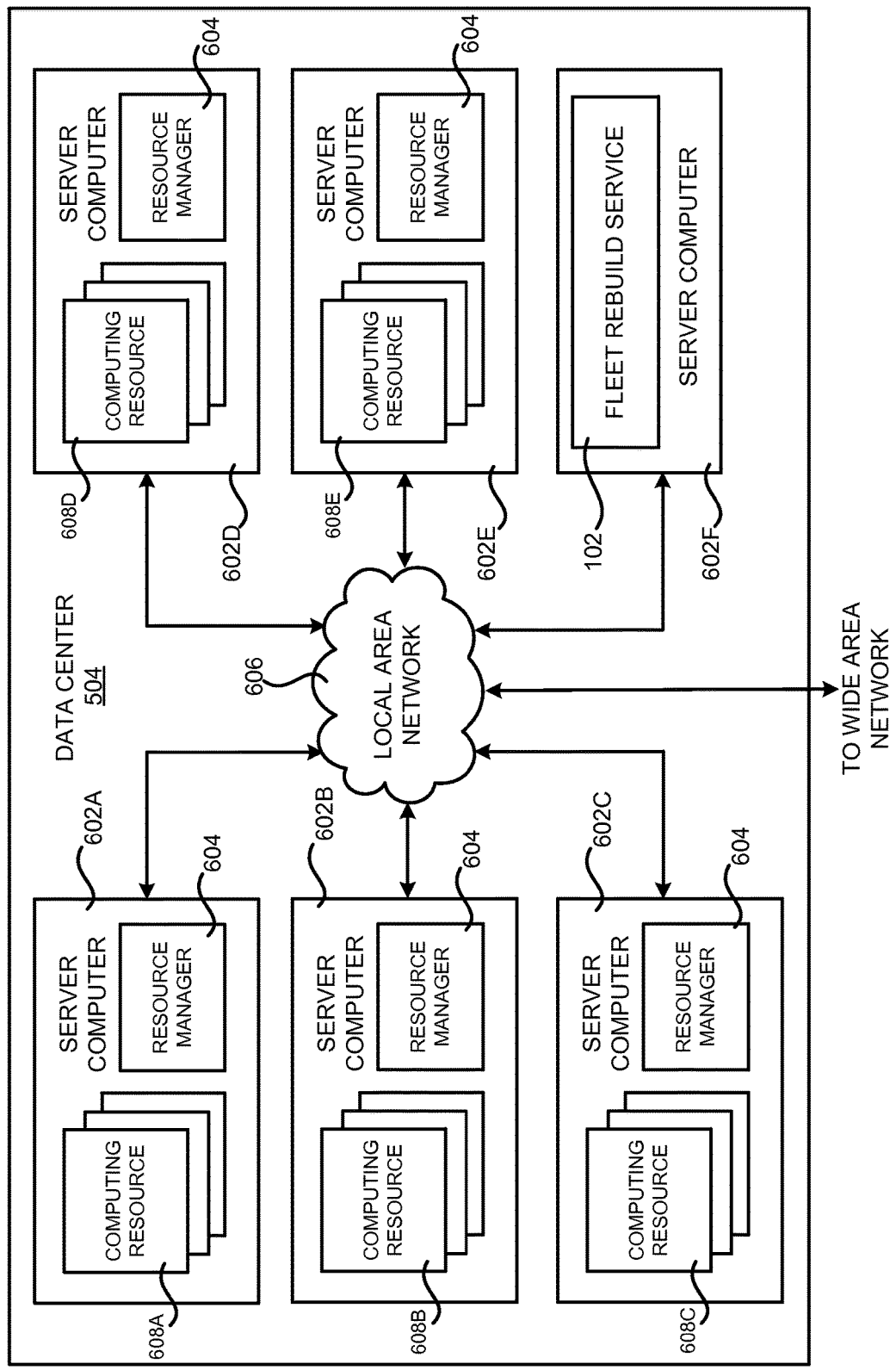
FIG. 6 is a computing system diagram that illustrates a configuration for a data center that may be utilized to implement aspects of the concepts and technologies disclosed herein.

FIG. 6 is a computing system diagram that illustrates one configuration for a data center 504 that implements aspects of the concepts and technologies disclosed herein for implementing a fleet rebuild service 102, according to one configuration disclosed herein. The example data center 504 shown in FIG. 6 includes several server computers 602A-602F (which may be referred to herein singularly as "a server computer 602" or in the plural as "the server computers 602") for providing computing resources 608A-608E.

The server computers 602 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources. In the case of virtual machine instances, for example, the resource manager 604 might be a hypervisor or another type of program configured to enable the execution of multiple virtual machine instances on a single server 602, for example. Server computers 602 in the data center 504 might also be configured to provide network services and other types of services, some of which are described in detail below with regard to FIG. 7.

The data center 504 shown in FIG. 6 also includes a server computer 602F that may be utilized for executing some or all of the software components described above. For example, and without limitation, the server computer 602F might be configured to execute the fleet rebuild service 102, which has been described in detail above. The server computer 602F might also be configured to execute other components and/or store data for providing some or all of the functionality described herein.

In the example data center 504 shown in FIG. 6, an appropriate LAN 606 is utilized to interconnect the server computers 602A-602F. The LAN 606 is also connected to the network 506 illustrated in FIG. 5. It should be appreciated that the configuration and network topology illustrated in FIGS. 1-6 has been greatly simplified and that many more computing systems, software components, networks, and networking devices may be utilized to interconnect the various computing systems disclosed herein and to provide the functionality described above. Appropriate load balancing devices or other types of network infrastructure components 118 might also be utilized for balancing a load between each of the data centers 504A-504N, between each of the server computers 602A-602F in each data center 504, and, potentially, between computing resources in each of the data centers 504. It should be appreciated that the configuration of the data center 504 described with respect to FIG. 6 is merely illustrative and that other implementations might be utilized.

Figure 7:
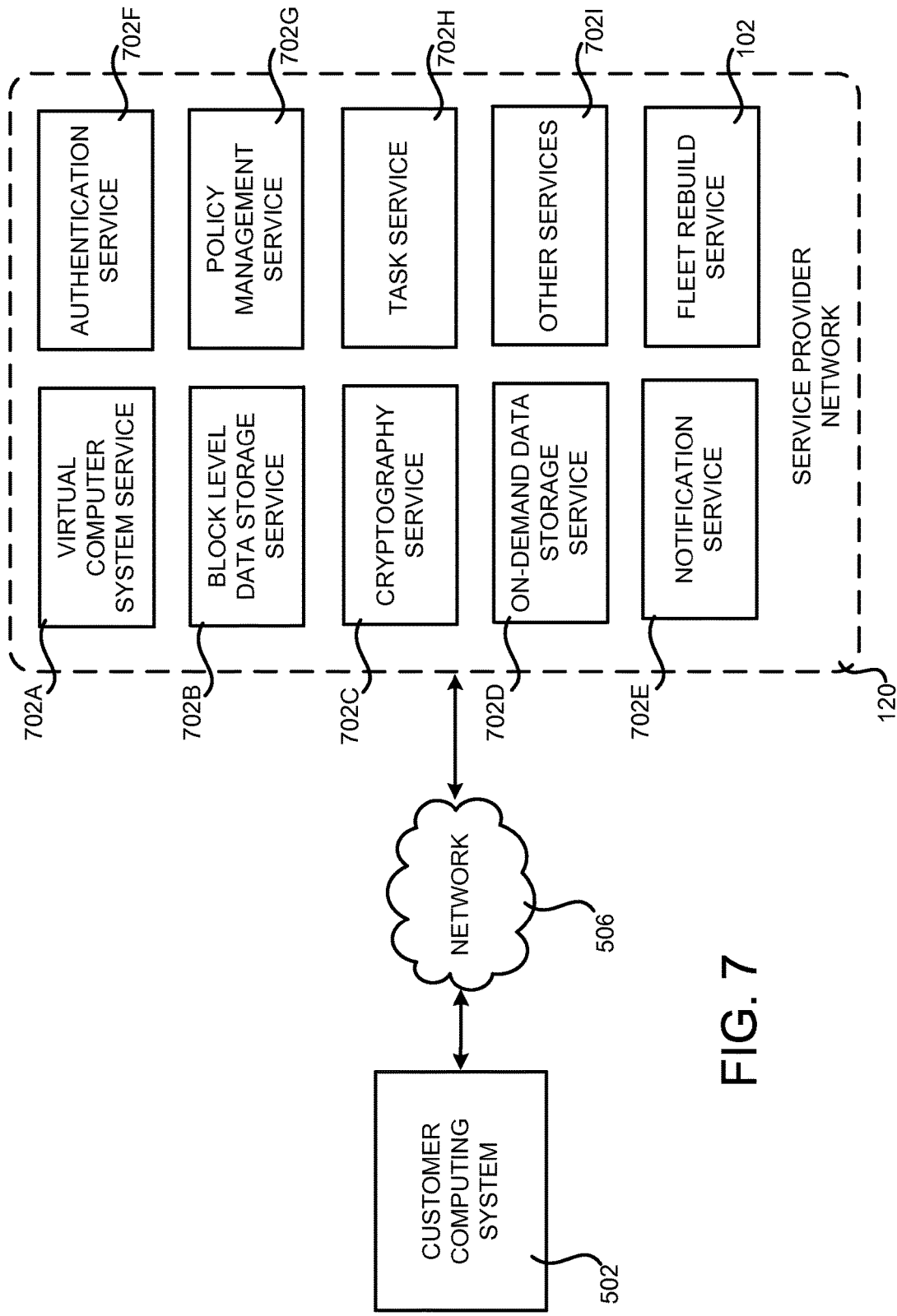
FIG. 7 is a system and network diagram that shows aspects of several services that might be provided by and utilized within a service provider network in one configuration disclosed herein.

FIG. 7 is a system and network diagram that shows aspects of several services 702 that might be provided by and utilized within a service provider network 120 in one configuration disclosed herein. In particular, FIG. 7 shows an example of a customer computing system 502 connected to the service provider network 120 through a network 506 in one example. As discussed briefly above, the service provider network 120 may provide a variety of services 702 to customers of the service provider network 120, including but not limited to, the fleet rebuild service 102.

It should be appreciated that customers of the service provider network 120 may be an organization that may utilize the services provided by the service provider network 120. Additionally, customers of the service provider network 120 may be individuals that utilize the services provided by the service provider network 120. As shown in FIG. 7, a customer may communicate with the service provider network 120 through a network 506, which may be a communication network, such as the Internet, an intranet or an Internet service provider ("ISP") network. Communications from the customer computing system 502 to the service provider network 120 may cause the services provided by the service provider network 120 to operate in accordance with configurations described or variations thereof.

As discussed briefly above, the service provider network 120 may provide various types of network services to its customers. The services provided by the service provider network 120, in this example, include a virtual computer system service 702A, a block-level data storage service 702B, a cryptography service 702C, an on-demand data storage service 702D, a notification service 702E, an authentication service 702F, a policy management service 702G, a task service 702H and, potentially, other services 702I. The service provider network 120 may also provide the fleet rebuild service 102 for use internally and by external customers.

It is noted that not all configurations described include the services 702A-702I described with reference to FIG. 7 and additional services may be provided in addition to or as an alternative to services explicitly described. Each of the services 702A-702I may include web service interfaces that enable a caller to submit appropriately configured API calls to the various services through web service requests. In addition, each of the services may include service interfaces that enable the services to access each other (e.g., to enable a virtual computer system of the virtual computer system service 702A, to store data in or retrieve data from the on-demand data storage service 702D, and/or to access block-level data storage devices provided by the block level data storage service 702B). Additional details regarding the services 702A-702H shown in FIG. 7 will now be provided.

The virtual computer system service 702A may be a collection of computing resources configured to instantiate virtual machine instances. For example, a customer of the service provider network 120 may interact with the virtual computer system service 702A (via appropriately configured and authenticated API calls) to provision and operate virtual computer systems that are instantiated on physical computing devices hosted and operated by the service provider network 120. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the virtual computer system service 702A is shown in FIG. 7, any other computer system or computer system service may be utilized in the service provider network 120, such as a computer system or computer system service that does not employ virtualization or instantiation and instead provisions computing resources on dedicated or shared computers/servers and/or other physical devices.

The block-level data storage service 702B may comprise computing resources that collectively operate to store data using block-level storage devices (and/or virtualizations thereof). The block-level storage devices of the block-level data storage service 702B may, for instance, be operationally attached to virtual computer systems provided by the virtual computer system service 702A to serve as logical units (e.g., virtual drives) for the computer systems. A block-level storage device may enable the persistent storage of data used/generated by a corresponding virtual computer system where the virtual computer system service 702A may only provide ephemeral data storage.

The service provider network 120 may also include a cryptography service 702C. The cryptography service 702C may utilize storage services of the service provider network 120 to store encryption keys in encrypted form, whereby the keys may be usable to decrypt customer keys accessible only to particular devices of the cryptography service 702C. The cryptography service 702C might also provide other types of functionality not specifically mentioned herein.

The service provider network 120 further includes an on-demand data storage service 702D. The on-demand data storage service 702D may be a collection of computing resources configured to synchronously process requests to store and/or access data. The on-demand data storage service 702D may operate using computing resources (e.g., databases) that enable the on-demand data storage service 702D to locate and retrieve data quickly, so as to allow data to be provided in responses to requests for the data. For example, the on-demand data storage service 702D may maintain stored data in a manner such that, when a request for a data object is retrieved, the data object can be provided (or streaming of the data object can be initiated) in a response to the request. As noted, data stored in the on-demand data storage service 702D may be organized into data objects. The data objects may have arbitrary sizes except, perhaps, for certain constraints on size. Thus, the on-demand data storage service 702D may store numerous data objects of varying sizes. The on-demand data storage service 702D may operate as a key value store that associates data objects with identifiers of the data objects which may be used to retrieve or perform other operations in connection with the data objects stored by the on-demand data storage service 702D.

The service provider network 120 might also provide a notification service 702E in some configurations. The notification service 702E may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol ("HTTP"), e-mail and short message service ("SMS"), among others). The notification service 702E may provide notifications to clients using a "push" mechanism without the need to periodically check or "poll" for new information and updates. The notification service 702E may further be used for various purposes such as monitoring applications executing in the virtual computer system service 702A, workflow systems, time-sensitive information updates, mobile applications, and many others.

As illustrated in FIG. 7, the service provider network 120, in various configurations, includes an authentication service 702F and a policy management service 702G. The authentication service 702F, in one example, is a computer system (i.e., collection of computing resources) configured to perform operations involved in authentication of users of the customer. For instance, one of the services 702A-702E and 702G-702I may provide information from a user to the authentication service 702F to receive information in return that indicates whether or not the requests submitted by the user are authentic.

The policy management service 702G, in one example, is a computer system configured to manage policies on behalf of customers or internal users of the service provider network 120. The policy management service 702G may include an interface that enables customers to submit requests related to the management of policy. Such requests may, for instance, be requests to add, delete, change or otherwise modify policy for a customer or for other administrative actions, such as providing an inventory of existing policies and the like.

The service provider network 120, in various configurations, is also configured with a task service 702H. The task service 702H is configured to receive a task package and to enable executing tasks as dictated by the task package. The task service 702H may be configured to use any resource of the service provider network 120, such as instantiated virtual machines or virtual hosts, for executing the task. The task service 702H may configure the instantiated virtual machines or virtual hosts to operate using a selected operating system and/or a selected execution application in accordance with specified requirements.

The service provider network 120 may additionally maintain other services 702I based, at least in part, on the needs of its customers. For instance, the service provider network 120 may maintain a database service is some configurations. A database service may be a collection of computing resources that collectively operate to create, maintain, and allow queries to be performed on databases stored within the service provider network 120. For example, a customer of the service provider network 120 may operate and manage a database from the database service by utilizing appropriately configured API calls. This, in turn, may allow the customer to maintain and potentially scale the operations in the database. Other services include object-level archival data storage services, services that manage and/or monitor other services. The service provider network 120 might also be configured with other services not specifically mentioned herein.

Figure 8:
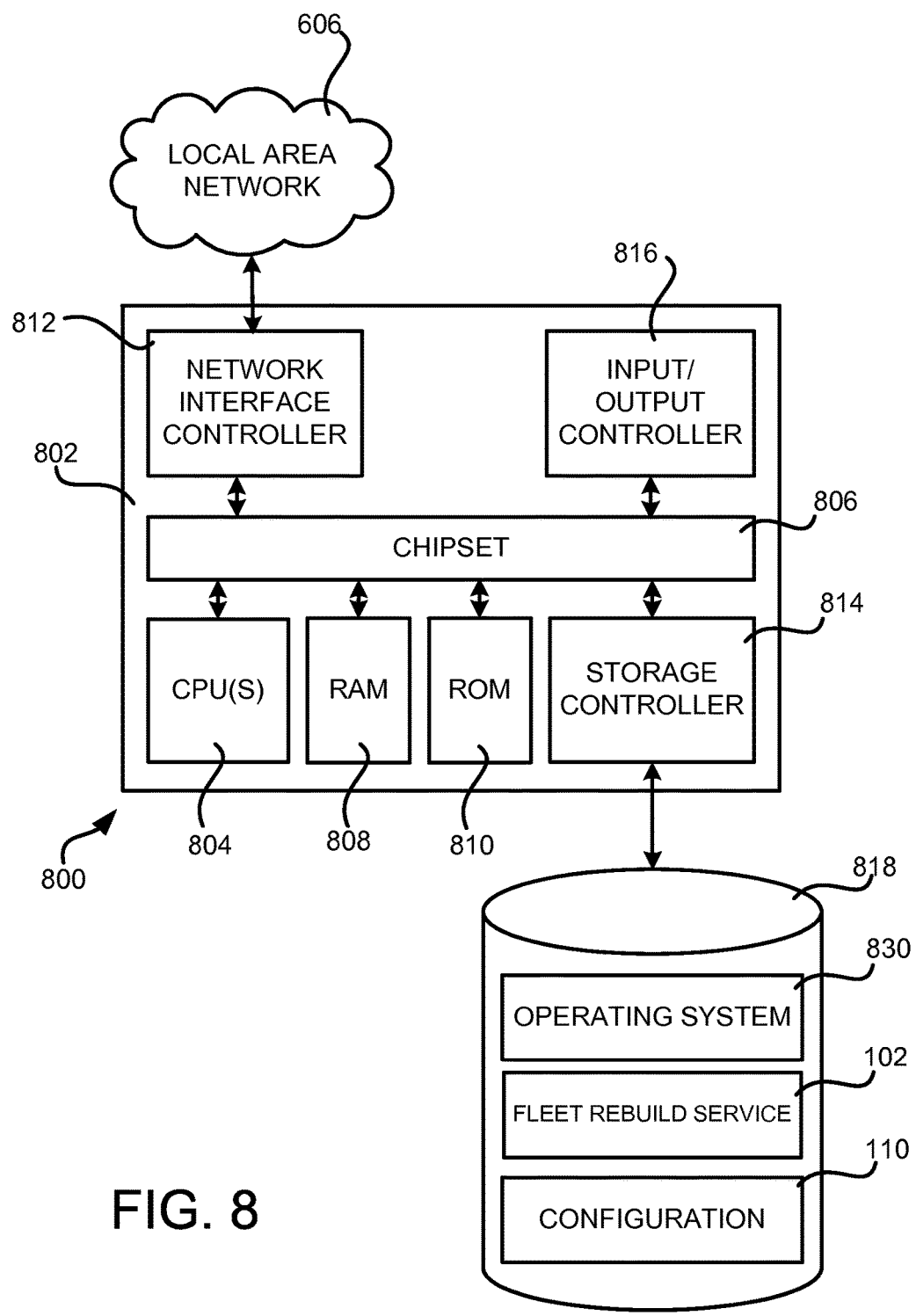
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing program components for implementing the fleet rebuild service 102 in the manner described above. The computer architecture shown in FIG. 8 illustrates a conventional server computer, workstation, desktop computer, laptop, tablet, network appliance, e-reader, smartphone, or other computing device, and may be utilized to execute any of the software components presented herein. For example, the computer architecture shown in FIG. 8 may be utilized to execute software components for providing the fleet rebuild service 102 and/or related functionality. The computer architecture shown in FIG. 8 might also be utilized to implement a customer computing system 502 or any other of the computing systems described herein.

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the local area network 606. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 818 may store other system or application programs and data utilized by the computer 800, such as the fleet rebuild service 102, the configuration 110, and/or any of the other software components and data described above. The mass storage device 818 might also store other programs and data not specifically identified herein.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various routines described above with regard to FIGS. 3A, 3B and 4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for providing a fleet rebuild service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   evaluate hosts in a fleet of hosts in a service provider network to determine if any host in the fleet of hosts is to be rebuilt;
   in response to determining that a first host is to be rebuilt, cause the first host to be moved from the fleet of hosts to a vetting pool;
   cause one or more automated tests to be performed on the first host while the first host is in the vetting pool;
   move the first host from the vetting pool to a provisioning pool in response to determining that the first host passed the one or more automated tests;
   move the first host from the vetting pool to a diagnostics pool in response to determining that the first host did not pass the one or more automated tests;
   cause one or more additional tests to be performed on the first host and initiate a repair of the first host while the first host is in the diagnostics pool;
   cause the one or more additional tests to be performed on the repaired first host;
   move the repaired first host from the diagnostics pool to the vetting pool in response to determining that the repaired first host passes the one or more additional tests;
   move the repaired first host from the vetting pool to the provisioning pool in response to determining that the repaired first host passed the one or more automated tests; and
   select a second host from the provisioning pool, configure the second host, and move the second host from the provisioning pool to the fleet of hosts.

2. The non-transitory computer-readable storage medium of claim 1, having further computer-executable instructions stored thereupon to receive one or more rebuild parameters defining when the hosts in the fleet of hosts are to be rebuilt, and
   wherein evaluating the hosts in the fleet of hosts comprises utilizing the one or more rebuild parameters to evaluate the hosts in the fleet of hosts to determine whether any host in the fleet of hosts is to be rebuilt.

3. The non-transitory computer-readable storage medium of claim 2, wherein the rebuild parameters comprise one or more of a time schedule for rebuilding the hosts in the fleet of hosts, a maximum age of software or hardware of the hosts in the fleet of hosts, one or more health parameters, one or more operational metrics, or one or more restrictive parameters for use in determining when the hosts in the fleet of hosts are to be rebuilt.

4. The non-transitory computer-readable storage medium of claim 1, having further computer-executable instructions stored thereupon to receive one or more provisioning parameters for use in selecting hosts for addition to the fleet of hosts from among one or more hosts in the provisioning pool, and wherein selecting the second host from the provisioning pool comprises utilizing the one or more provisioning parameters to select the second host from the provisioning pool for provisioning to the fleet of hosts.

5. The non-transitory computer-readable storage medium of claim 4, wherein the one or more provisioning parameters comprise one or more of fleet size preferences or requirements, hardware preferences or requirements, location preferences or requirements, or cost preferences or requirements.

6. An apparatus for rebuilding hosts in a fleet of hosts in a service provider network, the apparatus comprising:
a processor; and
a non-transitory computer-readable storage medium having instructions stored thereupon which are executable by the processor and which, when executed, cause the apparatus to provide a fleet rebuild service configured to:
evaluate the hosts in the fleet of hosts to determine if a first host is to be rebuilt; and
in response to determining that the first host is to be rebuilt:
move the first host from the fleet of hosts to a vetting pool for automated testing;
cause the first host to be moved from the vetting pool to a provisioning pool in response to determining that the first host passed the automated testing;
cause the first host to be moved from the vetting pool to a diagnostics pool in response to determining the first host failed the automated testing;
cause one or more additional tests to be performed on the first host and initiate a repair of the first host while the first host is in the diagnostics pool;
cause the one or more additional tests to be performed again on the first host in response to the repair of the first host;
move the first host from the diagnostics pool to the vetting pool upon determining that the first host passes the one or more additional tests; and
select a second host from the provisioning pool for addition to the fleet of hosts, configure the second host, and move the second host from the provisioning pool to the fleet of hosts.

7. The apparatus of claim 6, wherein the hosts in the fleet of hosts are evaluated against one or more user-supplied rebuild parameters in order to determine if any host in the fleet of hosts is to be rebuilt.

8. The apparatus of claim 6, wherein one or more user-supplied tests are utilized to perform the automated testing of the first host in the vetting pool.

9. The apparatus of claim 6, wherein
the second host is selected from the provisioning pool for addition to the fleet of hosts using one or more user-supplied provisioning parameters, and wherein
the second host selected from the provisioning pool for addition to the fleet of hosts is configured using one or more user-supplied provisioning software components.

10. The apparatus of claim 6, wherein the fleet rebuild service is further configured to cause the first host to be deactivated prior to moving the first host from the fleet of hosts to the vetting pool.

11. The apparatus of claim 6, wherein the fleet rebuild service is further configured to activate the second host once the second host has been moved from the provisioning pool to the fleet of hosts.

12. A computer-implemented method for providing a fleet rebuild service for rebuilding hosts in a fleet of hosts in a service provider network, the method comprising performing computer-implemented operations for:
determining if a first host in the fleet of hosts in the service provider network is to be rebuilt;
in response to determining that the first host in the fleet of hosts is to be rebuilt, moving the first host from the fleet of hosts to a vetting pool for automated testing;
moving the first host from the vetting pool to a provisioning pool if the first host passes the automated testing;
moving the first host from the vetting pool to a diagnostics pool if the first host fails the automated testing;
causing one or more additional tests to be performed on the first host and initiating a repair of the first host while the first host is in the diagnostics pool;
in response to the repair of the first host, cause the one or more additional tests to be performed again on the first host;
upon determining that the first host passes the one or more additional tests, moving the first host from the diagnostics pool to the vetting pool; and
selecting a second host from the provisioning pool for addition to the fleet of hosts, configuring the second host, and moving the second host from the provisioning pool to the fleet of hosts.

13. The computer-implemented method of claim 12, wherein the hosts in the fleet of hosts are selected to be rebuilt based upon one or more user-supplied rebuild parameters, the rebuild parameters comprising one or more of a time schedule for rebuilding the hosts in the fleet of hosts, a maximum age of software or hardware, one or more health parameters, one or more operational metrics, or one or more restrictive parameters.

14. The computer-implemented method of claim 12, wherein the second host is selected for addition to the fleet of hosts based upon one or more user-supplied provisioning parameters, the provisioning parameters comprising one or more of fleet size preferences or requirements, hardware preferences or requirements, location preferences or requirements, or cost preferences or requirements.

15. The computer-implemented method of claim 12, wherein one or more user-supplied tests are utilized to perform the automated testing of the first host while the first host is in the vetting pool.

16. The computer-implemented method of claim 12, further comprising:
de-activating the first host prior to moving the first host from the fleet of hosts to the vetting pool; and
activating the second host after the second host has been moved from the provisioning pool to the fleet of hosts.

17. The computer-implemented method of claim 12, wherein the second host is configured using one or more user-supplied provisioning software components.

18. The computer-implemented method of claim 17, further comprising performing one or more automated tests on the second host after the second host has been configured using the one or more user-supplied provisioning software components.

\* \* \* \* \*